Patented Sept. 19, 1950

2,522,970

UNITED STATES PATENT OFFICE 2,522,970

MANUFACTURE OF GLYCOL PECTATES AND PECTINATES

Arnold B. Steiner, La Jolla, and Aaron Miller, San Diego, Calif., assignors to Kelco Company, San Diego, Calif., a corporation of Delaware No Drawing. Application June 15, 1946, Serial No. 677,116

13 Claims. (Cl. 260—209.5)

1

This invention relates to reactions between the lower alkylene oxides (epoxyparaffins) and various pectic substances by which the properties characteristic of the original substance are modified in important respects.

The constitution of the pectic substances is not clearly established but it is known that they are high polymers, usually having colloidal properties. It is also established that they contain carboxyl groups which enable them to form both normal and acid salts with bases. In the natural occurrence of these substances, part or all of the carboxyl groups are esterified by methyl groups. When only partially esterified the substances are known as pectinic acids while the term pectic acids is applied to those essentially free from methyl ester groups. This nomenclature is taken from 1943 report, committee of Division Agricultural and Food Chemistry, American Chemical Society. The commercial pectins appear to be acid salts of alkali-metal bases of varying methoxy-content pectinic acids.

The term "pectic substances" is used herein in the sense in which it is defined in the aforesaid report, adopted at the 1944 Spring meeting of American Chemical Society (Chemical and Engineering News, April 25, 1944, page 609) and is not intended to include food products containing only small proportions of such substances.

We have discovered that by reacting either pectic or pectinic acid with an alkylene oxide the calcium reactivity of the acid is reduced while the equivalent weight and the tolerance for acidity are increased. Each of these changes is beneficial in one or another utilization of the product of the reaction, which tends also to increase water-solubility and to impart that property to the normally insoluble pectic acids.

In carrying out this reaction the following general procedure is followed. First (preferably but not necessarily) any base or bases which may be in combination with the acid are removed by treating the pectic substance with a dilute, acidified, aqueous solution of a water-miscible alcohol. A mixture of 100 parts 2-propanol, 67 parts water and 8.5 parts concentrated hydrochloric acid is suitable for this purpose. Application of this mixture leaves the water-soluble pectins and pectinates in solid form and removes the bases from combination without altering the original degree

2 of esterification. The pectic substance is then thoroughly washed in this or a similar mixture, drained and air-dried.

The resultant free acid (or in some cases the original pectic substance) is then brought to about 50% solids by the addition of water. Wetting may be facilitated by the prior addition of a small quantity of an alcohol though any large addition should be avoided as it may interfere with reactivity. This 50% relation of water to pectic substance is not critical but in most cases is favorable to complete reaction.

On the incorporation of the alkylene oxide with the dampened pectic substance, reaction occurs spontaneously with the generation of heat. In the modification referred to hereinafter as the "low pressure" method, addition of the oxide is performed at atmospheric pressure and temperature and with constant stirring, the rate of addition being so controlled as to maintain the temperature slightly below 45° C. in the case of 1,2 propylene oxide. After incorporation is completed at this rate the mixture is allowed to stand over night, or until the reaction heat has disappeared.

In the modification referred to hereinafter as the "high pressure" method the dampened pectic substance is placed in a closed stirring vessel provided with a jacket for heating or cooling and the temperature is maintained at a somewhat higher level, say about 50° C., the oxide being introduced through a pressure feeding device at such rate as to maintain the vapor pressure in the stirring vessel at about 10# gauge. After all the oxide has been added, heating and agitation are continued for at least an hour, after which the mass is allowed to stand over night to allow the reaction to come to completion.

The reaction product is usually a powder, or a mass which is readily friable after drying in an air stream at 50/55° C. If of a gummy consistency, as sometimes occurs, it should be leached with alcohol and then dried, after which it may readily be ground to a powder.

The effects produced by these reactions on various pectic substances are illustrated by the results of the following experiments:

*Experiment 1.—Treatment of commercial pectins*

Three commercial pectins of the jellying type (Nos. 1 and 2 being citrus pectins and No. 3 an apple pectin) were treated, without acidification and by the low pressure method, with 1,2 propylene oxide and the properties of each product were compared with those of the original substance:

|   | Pectin #1 | | Pectin #2 | | Pectin #3 | |
|---|---|---|---|---|---|---|
|   | Original | Product | Original | Product | Original | Product |
| A | 0:0 | 1:14 | 0:0 | 1:3 | 0:0 | 1:1 |
| B | Yes | Yes | Yes | Yes | Yes | Yes |
| C | Low | 2/700 | 2/1340 | 2/620 | 2/1500 | 2/1550 |
| D | 2/3.0 | 1/6.4 | 1/2.7 | 1/4.7 | 1/3.1 | 1/3.2 |
| E | 1,300 | 6,097 | 1,470 | 2,990 | 632 | 781 |
| F | High | None | Fair | Low | High | Fair |

A=molecular ratio pectinic substance to alkylene oxide.
B=solubility in water.
C=viscosity in aqueous solution, e. g., 2/700=700 centipoises in 2% solution.
D=hydrogen ion concentration, e. g., 2/3.0=pH 3.0 in 2% aqueous solution.
E=equivalent weight.
F=relative calcium reactivity.

Experiment 2.—Treatment of pectinic acid

A commercial apple pectin was treated with acidified dilute alcohol as above described, liberating the pectinic acid. The product was then treated with different proportions of 1,2 propylene oxide and the properties of the products were compared with those of the original pectin and of the pectinic acid produced from it:

|   | Pectin | Acid | Products | | | |
|---|---|---|---|---|---|---|
| A | None | None | [1] 1:4 | 1:4 | 1:8 | 1:8 |
| B | Yes | No | Yes | Yes | Yes | Yes |
| C | 2/1500 |  | 2/1200 | 1.5/400 | 2/1280 | 5/3000 |
| D | 2/2.90 |  | 0.5/3.0 | 0.5/3.1 | 0.5/3.5 | 1.0/5.6 |
| E |  | 467 | 736 | 812 | 2,577 | 14,326 |
| F | High |  | Fair | Fair | Low | None |
| G | None | None | L. P. | L. P. | L. P. | H. P. |

A=molecular ratio pectinic acid to alkylene oxide.
B=solubility in water.
C=viscosity in given aqueous solution, e. g., 2/1500=1500 centipoises in 2% solution.
D=hydrogen ion concentration; e. g., 2/2.90=pH 2.90 in 2% aqueous solution.
E=equivalent weight.
F=relative calcium reactivity.
G=treatment method used, e. g., L. P.=low pressure.
[1] Reacted at 38% solids. All other tests at 50% solids.

Experiment 3.—Treatment of pectic acid

A sample of commercial pectic acid, substantially free from methoxy groups, was treated with various proportions of 1,2 propylene oxide and the properties of the products were compared with those of the original acid:

|   | Pectic Acid | Products | | | | |
|---|---|---|---|---|---|---|
| A | None | 1:1 | 1:1.5 | 1:2 | 1:4 | 1:5 |
| B | No | (a) | (b) | Yes | Yes | Yes |
| C |  |  | 50 | 135 | 105 | 120 |
| D |  | 3.00 | 3.02 | 3.02 | 3.05 | 3.29 |
| E | 200 | 3.91 | 464 | 585 | 893 | 1030 |
| F |  | High | Fair | Fair | None | Trace |
| G |  | H. P. | H. P. | H. P. | H. P. | L. P. |

A=molecular ratio pectic acid to alkylene oxide.
B=solubility in water: (a) incompletely soluble, (b) slight insoluble residue.
C=viscosity in centipoises in 5% aqueous solution.
D=pH value in 1% aqueous solution.
E=equivalent weight.
F=relative calcium reactivity.
G=treatment method used.

The results of the above experiments evidence material changes in properties following from the reaction, which may be generalized as follows:

*Pectins (Experiment 1.)*—The principal effect of the application of the treatment to the pectins is in lowering the calcium reactivity. The original No. 1 pectin sets to a gel when contacted with calcium salts while the products of the treatments are approximately or entirely nonreactive. In the case of the other two pectins, both the raw material and the product are reactive, but the reactivity of the products is so reduced as to make them milk soluble whereas the original pectins are substantially insoluble in milk.

*Pectinic acids (Experiment 2).*—The hydroxyalkylation of the carboxyl groups of the pectinic acids brings about increased water-solubility, increased solubility in acidic solutions and decreased calcium reactivity. These properties are progressively accentuated as the equivalent weight (degree of esterification) is increased.

*Pectic acid (Experiment 3).*—The most important result of the application of the reaction to pectic acid is to impart the water-solubility in which this acid is totally lacking. As in the treatment of other classes of pectic substances, the reactivity with alkaline-earth metals is reduced or destroyed.

In all cases, esterification of the free carboxyl groups increases the equivalent weight and reduces the proportion of a base with which the product will combine. While several processes for reducing the equivalent weight (by demethyloxylation) have been proposed and used, this is the first commercially workable disclosure, so far as we are aware, of a method for increasing the equivalent weight, or for increasing the molecular weight other than by combination with a base.

In the above experiments the same epoxyparaffin (1,2 propylene oxide) was used throughout, to avoid the introduction of a variable into the operation. The reaction, however, is not so limited but is a general one, at least up to the point of lengthening hydrocarbon chain at which the oxide becomes substantially water-insoluble and possibly, under more strenuous reaction conditions, even beyond this point. This is illustrated by the results of the following experiments:

Experiment 4.—Reaction with ethylene oxide

Pectinic acid prepared from apple pectin was dampened with water to 50% solids and reacted by the high pressure method with an excess of ethylene oxide for seven hours. The product had 95% of the free carboxyl groups esterified and a 2% aqueous solution had a pH value of 5.9.

Experiment 5.—Reaction with trimethylene oxide

Pectinic acid from apple pectin was dampened with water to 50% solids and reacted by the high pressure method with four moles of trimethylene oxide for sixteen hours. The product had 87% of the free carboxyl groups esterified and a 2% aqueous solution showed a pH value of 5.5.

Experiment 6.—Reaction with butylene oxide

Pectinic acid prepared from citrus pectin was dampened with water to 50% solids and 15% of the carboxyl groups neutralized with ammonium hydroxide. The partially neutralized product was reacted by the high pressure method with two moles of 1,2 epoxybutane for 24 hours. The product had 67% of the available carboxyl groups (those remaining free after partial neutralization) esterified.

*Experiment 7.—Reaction with pentylene oxide*

Pectic acid from citrus fruit was dampened to 50% solids and reacted for 24 hours by the high pressure method with three moles 1,2 pentylene oxide. The product was 89% esterified and had a pH in 2% aqueous solution of 5.7.

*Experiment 8.—Reaction with heptylene oxide*

Pectic acid from a citrus source was dampened to 50% solids and reacted by the high pressure method with three and one-half moles of heptylene oxide. The product was 75% esterified and had a 5.5 pH in 2% solution.

*Experiment 9.—Reaction with octylene oxide*

Pectic acid from a citrus source was dampened with water to 50% solids and reacted for 24 hours with five moles of octylene oxide by the high pressure method. The product was 32% esterified.

The reaction between a pectic substance and 1,2 propylene oxide (as an example of the group of alkylene oxides) may be generalized as follows, R being any pectic substance:

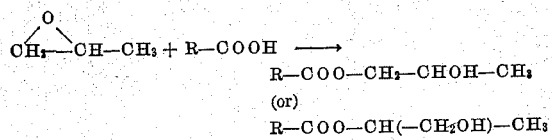

$$R-COO-CH_2-CHOH-CH_3$$
(or)
$$R-COO-CH(-CH_2OH)-CH_3$$

the former being a primary, the latter a secondary alcohol ester. It appears highly probable that the reaction product is a mixture of the two esters.

The product of the reaction may be characterized loosely as a glycol pectate or pectinate; more accurately as the addition product of an alkylene oxide and a pectic substance, or as a pectic substance having at least one of its carboxyl hydrogens replaced by an alcohol radical. The definition as a glycol pectate is not strictly accurate if the pectic substance is pectinic rather than pectic acid. The reaction is functional with pectic substances in all degrees of methoxylation (methyl esterification) and the term "glycol pectate" as used in some of the claims is intended to be inclusive of the pectates and the pectinates. The described treatment is applicable, so far as is known, to all pectic substances which do not contain excessive proportions of cellulosic matter.

The basic utility in the above described process is in affording a means for increasing the equivalent weight of a pectic substance almost at will. At the present time there is not, so far as we are aware, any known, practicable method for bringing about this change, the known reactions to which these substances are subjected being for the purpose of de-esterifying and thereby lowering the equivalent weight. It is, of course, known to convert these pectic substances to the form of salts, with a relatively small increase in molecular weight, but this step brings about a change in properties whch for many purposes is undesirable.

The above process, producing a wholly organic pectic substance, increases the water-solubility of the parent substance; in the case of pectic acid imparting water-solubility to an initially insoluble substance. It also decreases, to a marked degree, the reactivity of the parent substance with acids and with the alkaline-earth salts, thereby increasing the utility of the pectic substances in some of their most important applications.

We claim as our invention:

1. The method of modifying the properties of a substance selected from the group consisting of the pectins, the pectinic acids and pectic acid and having at least one free carboxyl group which consists in esterifying said substance with at least one equivalent of an alkylene oxide containing not more than eight carbon atoms and which is at least slightly soluble in water.

2. The method of modifying the properties of a substance selected from the group consisting of the pectins, the pectinic acids and pectic acid and having at least one free carboxyl group which consists in esterifying said substance with at least one equivalent of an alkylene oxide containing not more than eight carbon atoms.

3. The method of modifying the properties of a substance selected from the group consisting of the pectins, the pectinic acids and pectic acid which consists in freeing any neutralized carboxyl groups in said substance and thereafter esterifying the resultant free organic acid with at least one equivalent of an alkylene oxide containing not more than eight carbon atoms.

4. The method of modifying the properties of a substance selected from the group consisting of the pectins, the pectinic acids and pectic acid which consists in treating said substance with a water-diluted acid-alcohol mixture to free any neutralized carboxyl groups in said substance; expelling the alcohol from the resultant free organic acid, and esterifying said acid with at least one equivalent of an alkylene oxide containing not more than eight carbon atoms in the presence of a quantity of water not materially less than the dry weight of said acid.

5. A hydroxyalkyl ester of a pectic substance selected from the group consisting of the pectins, the pectinic acids and pectic acid: a water-soluble, solid body, characterized by a higher equivalent weight and a lesser reactivity with calcium ions than the parent pectic substance, said ester containing at least one hydroxyalkyl radical having not to exceed eight carbon atoms.

6. A hydroxyalkyl ester of a substance selected from the group consisting of the pectins, the pectinic acids and pectic acid: a water-soluble, solid body, characterized by a higher equivalent weight and a lesser reactivity with calcium ions than the parent substance, said ester containing at least one hydroxyalkyl radical having not to exceed eight carbon atoms.

7. A hydroxyalkyl ester of a substance selected from the group consisting of the pectins, the pectinic acids and pectic acid: a water-soluble, solid body, substantially nonreactive with calcium ions, said ester containing at least one hydroxyalkyl radical having not to exceed eight carbon atoms.

8. A hydroxyalkyl ester of a substance selected from the group consisting of the pectins, the pectinic acids and pectic acid and containing carboxyl groups: a water-soluble, solid body in which at least one of said carboxyl groups has its hydrogen replaced by a hydroxyalkyl radical containing not more than eight carbon atoms.

9. A hydroxyalkyl ester of a substance selected from the group consisting of the pectins, the pectinic acids and pectic acid and containing carboxyl groups: a water-soluble, solid body in which at least one of said carboxyl groups has its hydrogen replaced by a hydroxypropyl radical.

10. A hydroxyalkyl ester of pectic acid: a solid body, at least partially soluble in water, in which at least one of the carboxyl groups of said acid has its hydrogen replaced by a hydroxyalkyl radical containing not more than eight carbon atoms.

11. A hydroxyalkyl ester of pectinic acid: a water-soluble, solid body in which at least one of the carboxyl groups of said acid has its hydrogen replaced by a hydroxyalkyl radical containing not more than eight carbon atoms.

12. A hydroxyalkyl ester of pectic acid: a solid body, at least partially soluble in water, in which at least one of the carboxyl groups of said acid has its hydrogen replaced by a hydroxypropyl radical.

13. A hydroxyalkyl ester of pectinic acid: a water-soluble, solid body in which at least one of the carboxyl groups of said acid has its hydrogen replaced by a hydroxypropyl radical.

ARNOLD B. STEINER.
AARON MILLER.

REFERENCES CITED

The following references are of record in the file of this patent:

UNITED STATES PATENTS

| Number | Name | Date |
|---|---|---|
| 2,156,223 | Myers | Apr. 25, 1939 |
| 2,163,621 | Myers | June 27, 1939 |
| 2,189,949 | Griffith et al. | Feb. 13, 1940 |
| 2,232,926 | Peterson | Feb. 25, 1941 |
| 2,426,125 | Steiner | Aug. 19, 1947 |

OTHER REFERENCES

Hinton: Fruit Pectins, London 1939, pp. 64 and 65.